United States Patent [19]

Musick

[11] 3,998,693
[45] Dec. 21, 1976

[54] THERMAL MARGIN CONTROL
[75] Inventor: Charles R. Musick, Rockville, Conn.
[73] Assignee: Combustion Engineering, Inc., Windsor, Conn.
[22] Filed: Jan. 28, 1974
[21] Appl. No.: 437,239

Related U.S. Application Data

[63] Continuation-in-part of Ser. No. 91,808, Nov. 23, 1970, Pat. No. 3,791,922.
[52] U.S. Cl. .............................. 176/20 R; 176/24; 176/25; 176/60; 340/417
[51] Int. Cl.² ........................................ G21C 7/32
[58] Field of Search ................. 176/19 R, 20 R, 23, 176/24, 25, 60; 340/417

[56] References Cited
UNITED STATES PATENTS

| | | | |
|---|---|---|---|
| 3,234,100 | 2/1966 | Ogle | 176/19 R |
| 3,734,823 | 5/1973 | Brown et al. | 176/24 X |
| 3,752,735 | 8/1973 | Musick et al. | 176/20 R |
| 3,778,347 | 12/1973 | Giras et al. | 176/24 |

Primary Examiner—Verlin R. Pendegrass
Assistant Examiner—Peter A. Nelson

[57] ABSTRACT

A monitoring system for providing warning and/or trip signals indicative of the approach of the operating conditions of a nuclear steam supply system to a departure from nucleate boiling or coolant temperature saturation. The invention is characterized by calculation of the thermal limit locus in response to signals which accurately represent reactor cold leg temperature and core power; the core power signal being adjusted to compensate for the effects of both radial and axial peaking factor.

37 Claims, 3 Drawing Figures

THERMAL MARGIN CONTROL

CROSS REFERENCE TO RELATED APPLICATIONS

This application is a continuation-in-part of Application Ser. No. 091,808 filed Nov. 23, 1970, now U.S. Pat. No. 3,791,922 and assigned to the same assignee as the present invention.

BACKGROUND OF THE INVENTION

1. Field of the Invention

The present invention relates to safety systems for nuclear reactors. More specifically, this invention is directed to the prediction of internal reactor conditions commensurate with maintaining the integrity of the fuel element cladding. Accordingly, the general objects of the present invention are to provide novel and improved apparatus and methods of such character.

2. Description of the Prior Art

The performance of a nuclear reactor, like that of many other energy conversion devices, is limited by the temperature which component materials will tolerate without failure. In the case of a reactor with a core comprising an assemblage of fuel assemblies which in turn consist of an array of fuel rods or pins, the upper limit of temperature is imposed by the fuel rod or fuel pin cladding material employed. In order to adequately protect the reactor core against excessive temperatures, it is necessary to examine the temperature of the "hottest" fuel pin or the hottest coolant channel between adjacent fuel pins of the core since demage will first occur in the hottest fuel pin. Thus, the hottest pin or channel becomes the limiting pin or channel for the reactor core.

As is well known, heat is generated in a reactor by the fission process in the fuel material. The fission process, however, produces not only heat but radioacitve isotopes which are potentially harmful and which must be prevented from escaping to the environment. To this end, the fuel is clad with a material which retains the fission products. In order to prevent clad overheating, in the interest of precluding the release of the fission products which occur on clad damage or failure, a coolant is circulated through the reactor core. Heat transferred to the circulating coolant from the fuel elements is extracted therefrom in the form of usable energy downstream of the reactor core in a steam generator. Thus, for example, in a pressurized water reactor system the water flowing through the core is kept under pressure and is pumped on the tube side of a steam generator where its heat is transferred to the water on the shell side of the generator. The water on the shell side of the steam generator is under lower pressure and thus thermal energy transfer causes the secondary water to boil and the stream so generated is employed to drive a turbine.

To summarize, in the design and operation of a nuclear reactor, the basic objective of removing heat from the fuel must be obtained without allowing the temperature of the fuel cladding of the limiting fuel pin to rise to such a degree that the clad will fail.

As the coolant circulates through the reactor core heat will be transferred thereto either through sub-cooled convection, often referred to as film conduction, or through nucleate boiling. Nucleate boiling occurs at higher levels of heat flux and is the preferred mode of operation since it permits more energy to be transferred to the coolant thereby permitting the reactor to be operated at a higher level of efficiency. Nucleate boiling is characterized by the formation of steam bubbles at nucleation sites on the heat transfer surfaces. These bubbles break away from the surface and are carried into the main coolant stream. If the bulk coolant enthalpy is below saturation, the steam bubbles collapse with no net vapor formation in the channel. This phenomenon is called sub-cooled boiling or local boiling. If the bulk fluid enthalpy is at or above the enthalpy of saturated liquid, the steam bubbles do not collapse and the coolant is said to be in bulk boiling.

If the heat flux is increased to a sufficiently high value, the bubbles formed on the heat transfer surface during nucleate boiling are formed at such a high rate that they can not be carried away as rapidly as they are formed. The bubbles then tend to coalesce on the heat transfer surface and form a vapor blanket or film. This film imposes a high resistance to heat transfer and the temperature drop across the film can become very large even though there is no further increase in heat flux. This transition from nucleate boiling to film boiling is called "departure from nucleate boiling", hereinafter referred to as DNB, and the value of the heat flux at which DNB occurs is called the "DNB heat flux" in a pressurized water reactor and the "critical heat flux" in a boiling water reactor. Similarly, if the quantity of steam per coolant volume becomes too great a condition known as "excessive void fraction" may occur. Excessive void fraction may result in flow instabilities or a decrease in the heat transfer coefficient from the cladding to the coolant.

Since clad damage is likely to occur because of a decrease in heat transfer coefficient and the accompanying higher clad temperature which may result when DNB or excessive void fraction occurs, the onset of these conditions must be sensed or predicted and corrective action in the form of a reduction in fission rate promptly instituted. Restated, in reactor operation DNB must be prevented since the concurrent reduction in clad strength as temperature increases can lead to a clad failure because of the external coolant pressure or because of the internal fission gas pressures in the fuel rod. One way of monitoring DNB in a reactor is to generate an index or correlation which indicates the reactor condition with respect to the probability of the occurrence of DNB. For a theoretical discussion of the prediction of the onset of DNB, reference may be had to the article "Prediction Of DNB For An Axially Non-Uniform Heat Flux Distribution" by L. S. Tong which appeared in the *Journal Of Nuclear Energy*, 21:241, 1967.

The ratio of the heat flux necessary to achieve DNB at specific local coolant conditions to the actual local heat flux is known in the art as the departure from nucleate boiling ratio (DNBR) or the critical heat flux ratio. The two correlations, DNBR and critical heat flux ratio, are based upon slightly differing statistical derivations such that the critical values of DNBR and critical heat flux ratio are defined to be 1.3 and 1 respectively. These are the statistically established limiting values above which DNB has a very small probability of occurring. As employed herein, in the interest of facilitating understanding of the invention, DNBR will be used to describe both correlations. Thus, for the purposes of this discussion and description, DNBR shall mean both the Tong W-3 correlation for departure from nucleate boiling ratio and the critical heat flux ratio correlation.

It is known that DNB and excessive coolant void fraction occur as functions of the reactor operating parameters of heat flux or power distribution, primary coolant mass flow rate, primary coolant pressure and primary coolant temperature. In order to prevent an excessive coolant void fraction or DNB, also called "burn-out" or "boiling crisis", reactor protective systems must be designed to insure that reactor operation is rapidly curtailed, a condition known in the art as "reactor trip" or "reactor scram", before the combination of conditions commensurate with DNB or excessive coolant void fraction can exist. Departure from nucleate boiling and DNB ratio may be expressed for one fuel pin or channel as:

$$\text{DNBR} = f[Q, T_c, P, W, F_r, F_z(Z), T_{Az}] \quad (1)$$

where
$Q$ = core power in percent of full power
$T_c$ = coolant inlet temperature
$P$ = primary or reactor coolant system pressure
$W$ = coolant mass flow rate
$F_r$ = integral radial peaking factor
$F_z(Z)$ = axial power distribution in the pin which has the integral radial power peaking factor
$T_{Az}$ = azimuthal tilt magnitude (the azimuthal component of power distribution) which is a measure of side to side xenon tilt.

In computing DNBR, core power in percent of full power may be determined in a manner similar to that disclosed in U.S. Pat. No. 3,752,735 entitled "Instrumentation for Nuclear Reactor" and assigned to the assignee of the present invention. Integral radial power peaking factor is defined as the maximum ratio of power generated in any fuel pin in the core to the average fuel pin power in the absence of aximuthal flux tilt. Axial power distribution is defined for each fuel pin as a curve of local pin power density versus axial distance up the pin divided by the total power generated in the pin.

Solutions to the problem of protective system design assume that primary coolant mass flow rate, integral radial peaking factor and azimuthal tilt magnitude are maintained within predetermined limits during numerous events which necessitate a reactor trip to prevent the DNBR or coolant void fraction limits from being exceeded. Prior art approaches to protective system design have also assumed that the axial distribution of power in the reactor core was maintained within the limits of its normal operating envelope. For a full disclosure of a prior art thermal margin protection system based on the preceding assumptions, reference may be had to U.S. Pat. No. 3,791,922 entitled "Thermal Margin for a Nuclear Reactor Protection System" which is assigned to the same assignee as the present invention. U.S. Pat. No. 3,791,922 contains a detailed discussion of the means by which the locus of points at which a DNB or excessive coolant void fraction thermal limit will occur and the disclosure of said copending application is incorporated herein by reference.

Heretofore the prior art, including the technique and apparatus of referenced U.S. Pat. No. 3,791,922 has maintained core protection through means and methods which have been unduly conservative and thus have sacrificed plant operating margins. The assumption that certain operational parameters, and particularly axial power distribution, were either constants held at their design values or were variables which varied only within their allowed envelopes, has precluded reactor operation at power levels approaching the optimum for the existing conditions. The economic penalty imposed by unduly conservative safety system design is particularly apparent in the case of very large and high power reactors.

SUMMARY OF THE INVENTION

The present invention overcomes the above briefly discussed deficiencies of the prior art by providing a novel and improved thermal margin warning and control apparatus and method for use in a nuclear steam supply system. The present invention is characterized by the fact that it permits a nuclear reactor to be operated at higher and thus more efficient power levels than possible with previous techniques and controls of similar character.

In accordance with the present invention "reactor trip" is programmed primarily as a function of core primary coolant pressure. Accurate core primary coolant pressure, reactor inlet or "cold leg" temperature and core power signals are obtained or calculated and are employed in a calculation of the core thermal limit locus. A plot of the core thermal limits represents a locus of points at which 1.3 DNBR or void fraction limits occur for various conditions of coolant pressure, coolant temperature and core power. Thus, considering a protective system having a plurality of redundant channels, the present invention contemplates the generation of accurate signals commensurate with primary coolant cold leg temperature, corrected for stratification, and core power for each channel. These signals are supplied as the inputs to circuitry which calculates a variable thermal margin set point signal. This thermal margin set point or primary coolant pressure trip point signal corresponds to the minimum reactor coolant pressure which may be tolerated in the interest of safely avoiding the void fraction and DNB thermal limits for the existing conditions of primary coolant cold leg temperature and core power. The circuitry which calculates the pressure trip point signal also adjusts a selected signal commensurate with core power for the effects of both radial and axial peaking factor; the invention thus including an axial peaking factor function generator which receives an input commensurate with the axial offset or power distribution in the core.

Also in accordance with the invention, an accurate measure of core power is insured by auctioneering a first core power signal, as calculated as a function of measured neutron flux, with a second core power signal, as calculated as a function of coolant temperature rise between the upstream and downstream sides of the reactor core. The auctioneering of two measures of core power is an added safety feature.

A further novel feature of the present invention is the calculation of a signal commensurate with the primary coolant system pressure at which temperature saturation of the coolant will occur. This saturation pressure signal, prior to delivery as an input to an alarm and/or trip control, is auctioneered with the calculated primary coolant pressure trip point signal and with a further signal commensurate with the minimum permissible primary coolant pressure.

Another feature of the present invention is the utilization of accurate core power and cold leg temperature input signals. As noted above, the core power signal is generated by auctioneering two separate measurements of power and thereafter compensating the selected measure of power for axial and radial peaking factor. The cold leg temperature signal is corrected for stratification. Since the input signals to the computation circuitry for each channel of the present thermal margin control are corrected prior to utilization, the function generators for each channel of the invention are permitted to have the same coefficients or constraints. This, in turn, permits these coefficients to be set up prior to plant operation and facilitates simple switchability for various coolant pump flow configurations; the pump or flow selector switch being ganged to and thus simultaneously selecting the proper compensation factors for biasing selected input signals and for adjusting function generators in the calculation circuitry.

BRIEF DESCRIPTION OF THE DRAWING:

The present invention may be better understood and its numerous objects and advantages will become apparent to those skilled in the art by reference to the accompanying drawing in which.

DESCRIPTION OF THE PREFERRED EMBODIMENT

Figure 1A:
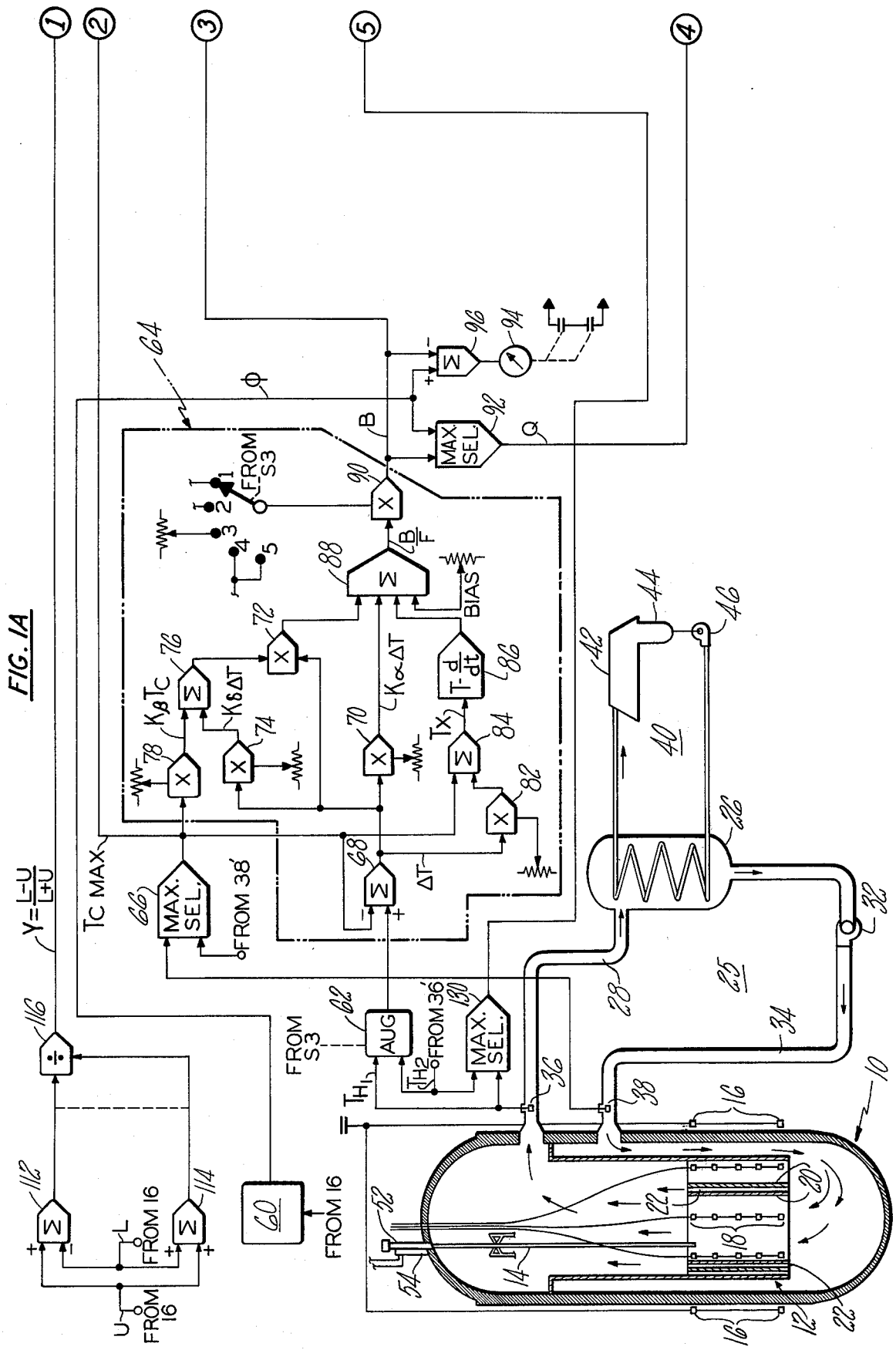
FIGS. 1A and 1B comprise a functional block diagram of one channel of a preferred embodiment of the present invention.
Figure 1B:
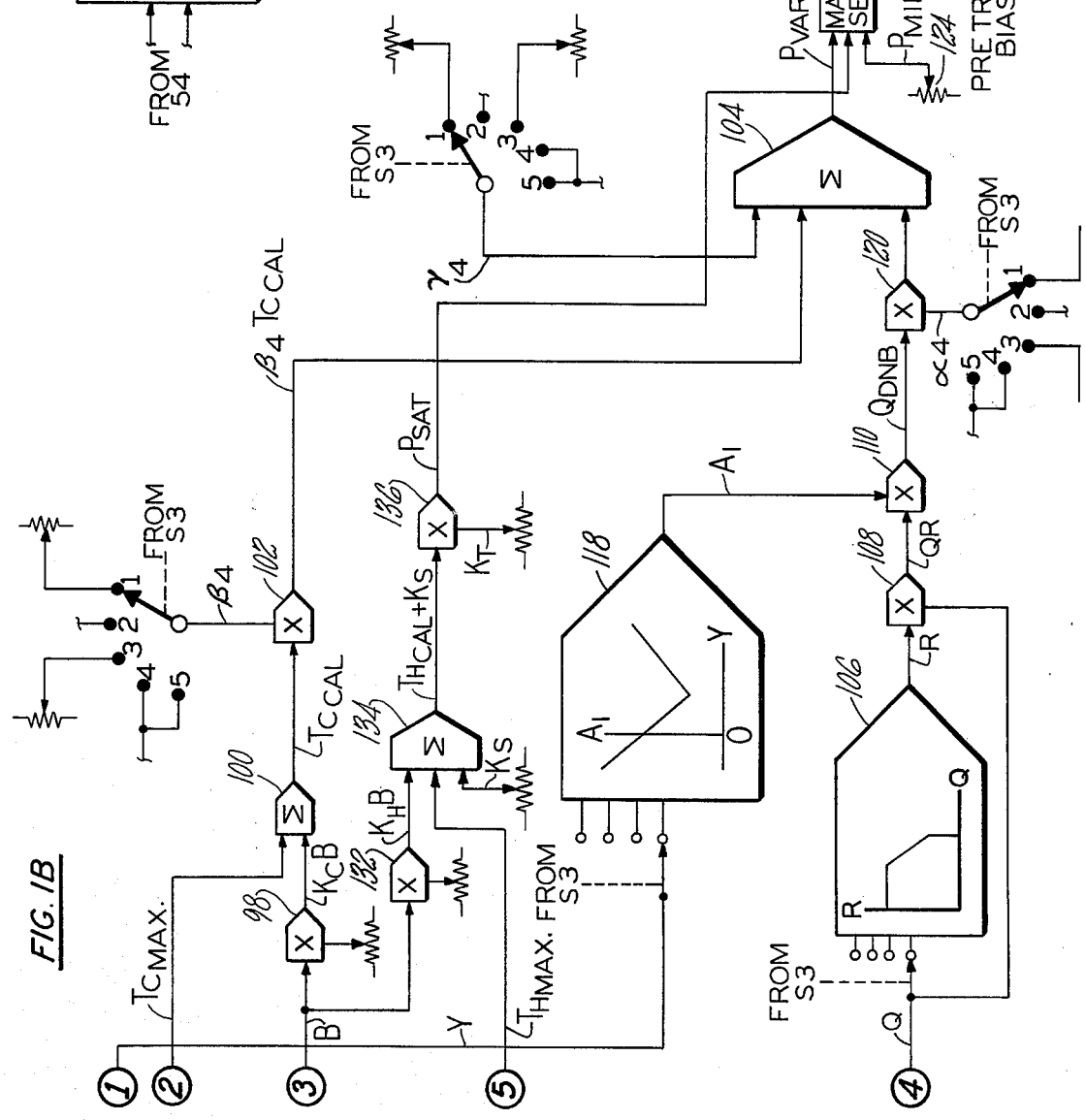

With reference to the drawing, FIGS. 1A and 1B comprise a functional block diagram of a preferred embodiment of the present invention as employed with a pressurized water reactor. The reactor is indicated schematically and generally at 10 and consists of a core 12 and control rods 14, only one of which is shown, which are movable into the core for reactor control. The core is constructed of a multitude of fuel pins 20, only a few of which are shown, which define coolant channels 22 through which the coolant is circulated.

The reactor coolant system 25 will typically include a plurality of coolant loops. In the drawing only a single loop, which includes a cold leg conduit 34 and a "hot leg" conduit 28, has been shown. In a typical installation the reactor coolant system may include four loops defined by four cold legs, each having associated therewith a circulator or pump, and two hot legs.

After being heated by energy transfer from the fuel elements in the core, the pressurized coolant will be delivered by the hot leg conduit or conduits to a stream generator 26. Heat is transferred from the primary coolant circulated through the core to a secondary coolant in the stream generator 26 to form steam which is contained in a secondary coolant system 40. The steam is delivered to a turbine 42 which converts the thermal energy of the steam into mechanical rotation for subsequent conversion into electrical energy in a generator. The secondary coolant, after passing through the turbine, is delivered to a condenser 44 and recirculated by feed water pump 46 back to the stream generator where it again absorbs thermal energy from the circulating primary coolant.

After passing through the steam generator 26 the primary reactor coolant is circulated back to the reactor through the cold leg conduit or conduits, such as conduit 34, by coolant pumps such as pump 32. A pressurizing system, not shown, is provided to maintain the pressure of the primary coolant within certain acceptable limits. After being delivered to the reactor pressure vessel through the cold leg 34, the coolant is forced to circulate downwardly around the outside of the core 12 and then upwardly through the interior of the core, through coolant channels 22, whereby thermal energy is transferred to the coolant and the fuel pins 20 are simultaneously cooled sufficiently to maintain the integrity of the cladding thereof.

Proper control of the nuclear reactor system required the sensing of all of those parameters necessary for a computation of the various design limit indices. External (ex-core) neutron detectors 16 are provided to monitor the neutron flux originating in the reactor core. Such ex-core detectors are commerically available devices, produce by Reuter Stokes, Inc. or the electronic tube division of Westinghouse Electric Corporation, which typically comprise split uncompensated ion chambers and associated signal generating circuitry. The reactor is also provided with "strings" of internal (in-core) neutron detectors 18 for monitoring the local power of individual sectors of the reactor core. Such in-core detectors are also commerically available devices produced, for example, by Reuter Stokes Canada Ltd. Information from the in-core detectors is necessary for the calculation of azimuthal tilt magnitude and is also used to calculate the axial power distribution. Temperature detectors 36 and 38, which may comprise commercially available platinum resistance temperature detectors (RTDs), are provided in hot leg 28 and cold leg 34 respectively to generate signals indicative of the temperature of the coolant as it enters and leaves the core. As will be described in detail below, signals commensurate with the sensed temperatures are employed in the calculation of core thermal power B. The cold leg temperature $T_C$ is also used in the calculation of DNBR. The reactor is also provided with a pressure sensor, not shown, which generates a signal commensurate with reactor primary coolant system pressure $P_{Pri}$.

The reactor 10 is further provided with a control rod position detection system 54. This system, which is conventional in the art, typically will be comprised of a plurality of reed switches positioned adjacent to and outside of each control rod housing 52. The rod position indicator may, for example, be similar to the position indicating apparatus of U.S Pat. No. 3,594,740. Information regarding coolant mass flow rate, azimuthal tilt magnitude, and the position of the control rods will be employed in the calculation of the locus of points at which DNB will occur. Periodically during plant operation the assumptions employed in plotting DNB will be verified.

Under normal conditions, considering a reactor installation wherein the coolant system includes four cold legs with associated circulator pumps, all four coolant circulator pumps will be operating. There may, however, be circumstances where less than all of the pumps will be utilized. A "pump selector" switch S3 is provided in order to permit the operator to coordinate the thermal margin protection system instrumentation with the actual pump operating configuration. The pump selector switch S3 is ganged with a plurality of switches in the thermal margin control.

It is to be understood that FIGS. 1A and 1B depict one of four indentical circuits or channels which will be employed with reactor 10 to predict the occurrence of DNB or excessive void fraction. For purposes of explanation, FIGS. 1A and 1B may be considered to disclose the process instrumentation for channel A of the thermal margin protection system. Each channel of the thermal margin protection system will have associated therewith a plurality of sensors which provide signals commensurate with the following reactor operating parameters:

$T_{C1}$ = coolant input or cold leg 34 temperature (sensor 38)

$T_{C2}$ = coolant input or cold leg 34' (not shown) temperature $T_{H1}$ = coolant output or hot leg 38 temperature (sensor 36)

$T_{H2}$ = coolant output or hot leg 38' (not shown) temperature $P_{Pri}$ = primary coolant pressure (measured at the pressurizer)

$\phi$ = reactor power computed as a function of measured neutron flux $U$ = upper ex-core neutron flux $L$ = lower ex-core neutron flux The sensors for providing signals commensurate with temperature, pressure and neutron flux have been discussed above. The means for calculating core power $\phi$ in percent of full power as a function of neutron flux, measured by the out-of-core flux detectors 16, is a state-of-the-art subsystem such as the "Instrumentation for Nuclear Reactor" of aforementioned U.S. Pat. No. 3,752,735 of C. R. Musick and Richard P. Remshaw and assigned to the assignee of the present invention. The $\phi$ or nuclear core power calculator is indicated at 60.

The $T_{H1}$ and $T_{H2}$ signals generated by the temperature sensors associated with the hot legs are delivered to an averaging device 62 associated with the pump selector switch S3. It is necessary that the averaging circuit 62 be ganged with the pump selector switch so that an output signal may be generated which is either the average of the hot leg temperatures or the temperature of the hot leg of the active loop in the situation where only the pumps in a single coolant loop are being operated. The average or selected hot leg temperature $T_H$ signal is employed as an input signal to a second core power calculator indicated generally at 64; calculator 64 being the thermal power calculator.

A pair of channel A cold leg temperature signals $T_{C1}$ and $T_{C2}$ are delivered to an auctioneering circuit 66. Circuit 66 may, for example, comprise a commerically available amplitude selector such as Bell & Howell type 19-502. Circuit 66 selects the highest of the two cold leg temperature signals applied at its input terminals and the output of circuit 66 is the $T_C$ cold leg temperature signal. This maximum cold leg or upstream coolant temperature signal is applied as a second input to the thermal power calculator 64.

In calculator 64 the selected $T_C$ signal is subtracted from the hot leg temperature $T_H$, in a summing circuit 68, to determine the temperature rise of the coolant across the core. The thermal power calculator 64 provides an output signal commensurate with core power as a function of the increase in temperature of the coolant between the upstream or cold leg side of the reactor core and the reactor output or hot leg. For a further and more detailed description of a core power calculator which is responsive to $T_C$ and $T_H$ input signals, reference may be had to aforementioned U.S. Pat. No. 3,752,735. The calculator 64 generates signals proportional to the first and second powers of temperature rise $\Delta T$ and a signal proportional to the product of $\Delta T$ and $T_C$. These three terms represent thermal power for four pump operation and steady state conditions taking coolant density, specific heat and flow rate variations with temperature and power into account. Restated, in order to utilize coolant temperature differential as a measure of core power, it is necessary to account for a number of variables which affect the rate at which thermal energy will be transferred to the coolant. The required compensation is accomplished in the course of synthesizing a steady state $\Delta T$ power measure signal and a signal which provides dynamic compensation for the steady state signal; a dynamic response term being added so as to provide an accurate core power indication during mild transients such as ramp load changes. In generating the steady state $\Delta T$ signal, the output of summing circuit 68 is applied to a first compensation network 70 wherein it is multiplied by a constant $K_\alpha$. Compensation circuit 70 may comprise merely a potentiometer. The signal resulting from the multiplication in circuit 70, $K_\alpha \Delta T$, represents the first power or primary component of a composite steady state $\Delta T$ power or B signal.

The $\Delta T$ signal from summing circuit 68 is also applied as an input to compensation circuits 72 and 74. In compensation circuit 74 the $\Delta T$ signal is multiplied by a constant $K_\delta$. Compensation circuit 74 may be identical to compensation circuit 70. The output of compensation circuit 74, a $K_\delta \Delta T$ signal, is applied to a summing circuit 76. A second input to summing circuit 76 is provided by a compensation circuit 78 which has applied, as the input thereto, the $T_C$ signal. The output of compensation circuit 78 is a signal commensurate with $K_\beta T_C$. Summing circuit 76 provides an output signal commensurate with the following term:

$$K_\delta \Delta T + K_\beta \Delta T \qquad (1)$$

The signal from summing circuit 76 is multiplied by the $\Delta T$ signal in compensation circuit 72 to generate a signal proportional to the second power of temperature rise and the product of temperature rise and cold leg temperature. This signal is as follows:

$$K_\delta \Delta T^2 + K_\beta T_C \Delta T \qquad (2)$$

As previously noted, the measure of core power as calculated from measured coolant thermal parameters may be made more accurate for slow and intermediate speed power transients by dynamically compensating the steady state signal for the rate of heat addition to the stored thermal energy content of the primary coolant. This may be accomplished by differentiating any primary coolant thermal parameter or combination thereof, multiplying by the appropriate gain factor and adding the product to the steady state $\Delta T$ expression of power. In the disclosed embodiment of the invention the $\Delta T$ signal from summing circuit 68 is applied to a multiplier 82 where it is multiplied by a gain factor "$a$". The gain factor $a$ is selected during field tests to match "thermal" power B to "nuclear" power $\phi$; $\phi$ being determined during the field test. The output of multiplier 82 and the $T_C$ signal from selector circuit 66 are applied to a summing circuit 84 to generate a signal proportional to the following relationship:

$$T_x = a \Delta T + T_C = aT_H + (1-a) T_C \qquad (3)$$

The $T_X$ signal is applied to a differentiating network 86 and the output of differentiator 86 is a signal commensurate with the following expression:

$$\tau [a\Delta T + T_C] \quad (4)$$

The output of differentiator 80 and the signals provided by multiplication circuits 70 and 72 are applied to a summing circuit 88. The output of summing circuit 88 is thus a measure of power as a function of the thermal energy added to the primary loop coolant and this signal may be expressed as follows:

$$= K_\phi \Delta T + K_\beta \Delta T (T_{Cmax} - 490) + K_\phi \Delta T^2 + \tau (T_{Cam} + a \Delta T)$$

where
- $B$ = percent of maximum core thermal power, and
- $F$ = a dimensionless constant having a value dependent upon the number of coolant circulator pumps in operation.

Summing circuit 88 may comprise an operational amplifier with input and feedback resistors such as, for example, Bell & Howell Adder-Subtractor Model No. 19-301-A.

It will, of course, be obvious to those skilled in the art that constants may be added to or subtracted from the various measured temperature parameters or terms so that the circuitry may operate on signals that are referenced to some temperature in or near the normal operating range of the reactor. Thus, for example, prior to application to the multiplier 78, the $T_C$ signal may be compared with a selected design condition temperature such as 490°F. This temperature adjustment is reflected in equation (5) above.

The signal from summing circuit 88 represents the core power as a function of thermal energy output for four-pump operation under steady state or mild transient conditions. This quotient is multiplied by a factor $F$, which is unity for four-pump operation and less than unity for other pump configurations, in a multiplication circuit 90. The multiplication factor $F$ compensates for the fact that, for a given power, the temperature rise is greater for reduced flow. A multiplying factor is selected by the flow dependent set point selector switch S3; i.e., the factor $F$ will be varied simultaneously with the selection of the operating circulator pump configuration in such a manner as to effectively attenuate the gain constants in equation (5) to thereby adjust the power signal to accommodate the fact that $\Delta T$ rises as the coolant flow rate is reduced with core power being held constant.

The thermal power $B$ signal passed by multiplier 90 and the nuclear power $\phi$ signal provided by calculator 60 are auctioneered in an auctioneering circuit 92. Circuit 92, which may be identical to circuit 66, selects the highest of the applied power signals and passes this Q signal on to the thermal margin set point calculator. The two separate measures of power are also applied to a null meter relay 94, which is a commerically available device produced by Sigma Corporation having an analog meter with two adjustable alarm points, via a summing circuit 96. The null meter relay 94 displays the difference between B and $\phi$. Meter relay 94 also establishes high and low alarm set points. Violation of these set points will cause generation of an alarm signal indicative of a need to recalibrate the $\phi$ channel. Restated, under normal steady state operating conditions the $\Delta T$ power signal is assumed to be more accurate than power measured as a function of neutron flux. Thus, a predetermined deviation between the two measures of power, as indicated by meter relay 94, is an indication of a need to recalibrate the $\phi$ channel.

The $B$ power signal passed by multiplier 90 is also applied to a further compensation circuit 98. Compensation circuit 98 may comprise a multiplier wherein the thermal power signal is multiplied by a stratification constant $K_C$. The stratification error in reactor primary coolant measurements is known to linear with power. Accordingly, the output of multiplier 98, the stratification compensation factor $K_C B$, will also vary linearly with power. The constant $K_C$ is established through a standard procedure wherein the actual value of $T_{C\,CAL}$ is determined utilizing all available temperature measurements; $K_C$ thereafter being adjusted so that the sum of $T_C$ and $K_C B$ as computed in a summing circuit 100, is equal to the determined value of $T_{C\,CAL}$. Thus, the output of summing circuit 100 is the selected $T_C$ signal compensated for stratification effects.

The Q power signal selected by auctioneering circuit 92 is applied as the input to a radial peaking factor function generator 106. In function generator 106 the signal commensurate with the maximum of nuclear or thermal power is modified in accordance with a control rod or control element assembly (CEA) position function. Function generator 106 thus generates an output signal R which is a compensation factor commensurate with a predetermined integral radial peaking factor versus power. A plot of peaking factor versus power is, of course, a function of the position of the control rods. In actual practice function generator 106 may comprise a plurality of function generators connected in parallel since radial peaking factor will also vary with the selected pump configuration. Alternatively, the curve or function generated by a single function generator 106 may be biased in accordance with operating pump configuration. In either case, the pump selector switch S3 will be ganged to the input selector switch for function generator or generators 106 so as to select the appropriate bias or function commensurate with the existing pump configuration. The curve shown in the drawing within function generator 106 is the radial peaking factor versus power curve for four pump operation. The manner in which the CEA or radial peaking factor function is calculated is well known in the art. It is also to be noted that a delay may be imparted to the input signal to function generator 106 so as to inhibit application of the power signal to the function generator during periods when power is being changed. As explained in U.S. Pat. No. 3,791,922, a delay in application of the power signal to function generation 106 enhances reactor safety by causing application of a conservatively high power signal to the thermal margin control during increases in power.

The compensation signal R provided by function generator 106 will vary in accordance with the amount of CEA insertion allowed for at various power levels. The signal R will thus vary between extremes of rod position. Compensation signal R and the selected power signal are multiplied in a multiplication circuit 108 to generate a power signal QR compensated for radial peaking factor. This radial peaking factor compensated power signal is thereafter applied to a further multiplication circuit 110 for the purposes to be described below.

The conditions under which DNB will occur, as discussed above, are also dependent on the axial power distribution that exists in the reactor core. In calculating axial power distribution the core is divided into two equal parts; the lower half of the core and the upper half of the core. The axial power distribution is integrated; by means not shown in the drawing but well known in the art, such means being responsive to the information provided by the ex-core neutron detectors; over each half of the core to produce upper and lower half power signals respectively U and L. Using the two values, U and L, a signal commensurate with the axial power offset Y can be generated. Thus, the axial offset Y can be generated, employing summing circuits 112 and 114 and division circuit 116, in accordance with the following equation:

$$Y = \frac{L - U}{L + U} \quad (6)$$

(6)

An examination of equation (6) shows that the axial power offset will be negative when the power distribution is peaked toward the top of the core and positive when the power distribution is peaked toward the bottom of the core. The axial offset is applied to an axial peaking factor function generator 118. Function generator 118 may, like radial peaking factor generator 106, in actual practice comprise either a plurality of function generators ganged with the pump selector switch or means for selectively biasing a single function whereby an axial peaking factor versus axial offset curve commensurate with the instantaneous coolant mass flow conditions will be selected. In the drawing the curve commensurate with four pump operation is depicted within function generator 118. The output of axial peaking factor function generator 118 is a compensation signal $A_1$ which varies continuously with the axial offset or axial power distribution and the pump configuration in accordance with curves plotted by the reactor designer. This technique may be contrasted with methods wherein normal set points are overriden and biased downwardly in the presence of grossly skewed axial power distribution.

The $A_1$ signal commensurate with axial peaking factor is applied as an input to multiplication circuit 110 wherein it is employed to modify the maximum QR power signal previously compensated for radial peaking factor. The output of multiplication circuit 110 is thus a $QRA_1$ signal; this signal also being known as the DNB power signal $Q_{DNB}$. The output of multiplication circuit 110 is applied to a further compensation circuit 120 wherein it is multiplied by a gain factor $\alpha_4$. The gain factor $\alpha_4$ is also selected by the flow dependent set point selector switch S3. The constant $\alpha_4$ is commensurate with the relationship between $Q_{DNB}$ and $P_{Pri}$ for a fixed DNB ratio when cold leg temperature is held consent. The output of multiplication circuit 120, an $\alpha_4$ $Q_{DNB}$ signal, is applied as a first input to a summing circuit 104.

The $T_{C\ CAL}$ signal from summing circuit 100 is delivered to a compensation circuit 102 wherein it is multiplied by a factor $\beta_4$; the factor $\beta_4$ being a constant commensurate with the relationship between $P_{Pri}$ and cold leg temperature for a constant DNB ratio when $Q_{DNB}$ is held constant. The constant $\beta_4$ is thus a function of the number of circulator pumps in operation and is selected by the flow dependent set point selector switch S3. This further compensation of the $T_{CAL}$ signal is for the purpose of adjusting the gain of the $T_{C\ CAL}$ input in such a fashion as to approximate the predetermined DNB locus for the particular pump operating configuration. The output of compensation circuit 102, a $\beta_4 T_{C\ CAL}$ signal, is applied as the second input to summing circuit 104.

A third input to summing circuit 104 is provided directly from the flow dependent set point selector switch S3. This third input, a $\gamma_4$ signal, is a constant commensurate with the desired pressure (thermal margin) trip set point for specified design values of $TC_{CAL}$ and $Q_{DNB}$ design values.

Figure 2:
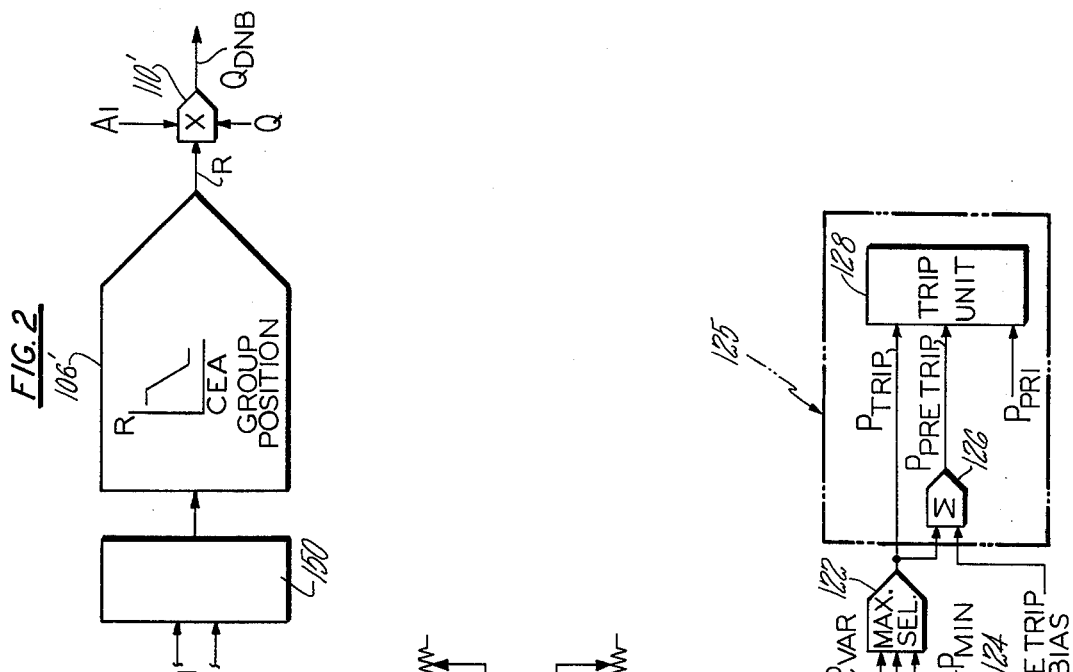
FIG. 2 is a functional block diagram of an alternative arrangement for a portion of the embodiments of FIG. 1.

Referring to FIG. 2 of U.S. Pat. No. 3,791,922 the locus of points which the 1.3 DNBR or void fraction limit occurs for various conditions of reactor inlet temperature, core power and primary coolant pressure is shown. This locus of points will be calculated by the reactor designer. Upon fueling and operation of the reactor the accuracy of the design data will, of course, be verified and the families of curves commensurate with 1.3 DNBR will be adjusted as necessary. The plot of 1.3 DNBR or void fraction limit, as is well known, establishes pressure limit curves commensurate with the violation of the DNBR or void fraction limit; the curves being plotted on the basis of the hot channel in the reactor core and with a substantial margin of safety. DNB may thus be expressed as follows:

$$DNB = f(Q_{DNB}, T_{CAL}, P_{Pri}) \quad (7)$$

In accordance with the present invention, a thermal margin protection system is provided wherein reactor trip is programmed as a function of coolant pressure. Summing circuit 104 calculates the pressure trip or thermal margin set point. This pressure trip point may be expressed as follows:

$$P_{VAR} = \alpha_4 Q_{DNB} + \beta_4 T_{CAL} + \gamma_4 \quad (8)$$

wherein the constants $\Gamma_4$, $\Delta_4$ and $\gamma_4$ are, as described above, provided by signal generators ganged to the pump selector switch.

In accordance with the present invention the potential effects of temperature saturation of the coolant may also be accommodated. As is well known, as water changes state from liquid to gas the temperature remains constant; i.e., in the temperature saturation state energy is used to change the state rather than to raise the temperature. In a nuclear steam supply system the primary coolant could conceivably receive enough energy to reach the temperature saturation state. Should this happen power measurments based upon the temperature rise of the coolant would be meaningless. Restated, it is possible that power can increase to the point where $T_H$ is pushed into saturation and thus becomes a constant independent of power level.

In order to insure the accuracy of the warning and control system of the present invention, the maximum hot leg temperature $T_{H_{\text{MAX}}}$ is selected by an amplitude selector circuit 130. The selected maximum hot leg temperature signal is delivered as a first input to a summing circuit 134. A second input to summing circuit 134 is a calibrated $\Delta T$ power signal B from core power calculator 64; the power signal being adjusted in a multiplication circuit 132 by a $K_H$ bias. The compensation signal $K_H$ is an adjustable field calibrated constant related to hot leg stratification. The output of multiplication circuit 132 is thus a temperature biasing term which is employed to correct the selected maximum hot leg temperature signal $T_{H_{\text{MAX}}}$ for the effects of stratification. A third input to summing circuit 134 is a $K_S$ bias signal; the $K_S$ signal being commensurate with an adjustable coefficient which defines the relationship between the corrected hot leg temperature and the precalculated reactor cooling system pressure at temperature saturation. The output of multiplication circuit 134 is thus a maximum hot leg temperature signal which has been calibrated for the effects of stratification and biased to take into account the relationship between the calibrated hot leg temperature and the saturation pressure. The output of summing circuit 134 is applied to a further multiplication circuit 136 where it is further adjusted by a constant $K_T$ commensurate with the relationship between hot leg temperature and reactor cooling system pressure at saturation. The output of multiplication circuit 136 is a $P_{SAT}$ signal commensurate with the pressure at which temperature saturation will occur.

The $P_{SAT}$ signal from compensation circuit 136 is applied as a first input to an amplitude selector circuit 122. The $P_{VAR}$ output signal from summing circuit 104 is applied as a second input to amplitude selector circuit 122. a minimum pressure trip point signal from an adjustable voltage source indicated schematically at 124 is also applied as an input to selector circuit 122. The $P_{MIN}$ signal provided by source 124 will be commensurate with the minimum permissible primary coolant pressure. Amplitude selector 122, which may be a Bell & Howell Model 19-502 amplitude selector, will select the input signal having the greatest magnitude for passage to a tripping control circuit indicated generally at 125. The output of selector circuit 122 will thus be the $P_{TRIP}$ signal which, in the manner to be described below, will provide a reactor trip when the coolant approaches the temperature saturated condition, or when the actual coolant pressure falls below a minimum permissible pressure or when a pressure trip set point calculated as a function of power exceeds the actual primary coolant pressure.

The signal passed by selector circuit 122 will also be applied to a summing circuit 126 in control 125. A signal commensurate with a pre-trip bias will be applied as the second input to summing circuit 126. The pre-trip bias will typically be commensurate with 100 psi and will cause the generation, in the manner to be described below, of a pre-trip alarm signal indicative of the fact that the core thermal limits are being approached. The pre-trip alarm signal will, of course, lead the actual reactor trip signal as a result of the bias provided by the pre-trip input to summing circuit 126.

A signal commensurate with the actual measured value of primary coolant pressure $P_{Pri}$, the $P_{PRETRIP}$ output signal from summing circuit 126 and the $P_{TRIP}$ signal from selector circuit 122 are applied as inputs to a "trip" unit 128. The trip unit 128 may comprise a plurality of bistable circuits wherein the pre-trip signal from summing circuit 126 is compared with the actual pressure signal $P_{Pri}$ and, when the biased set point signal exceeds the actual pressure signal, an alarm output will be provided. Similarly, the $P_{TRIP}$ signal will be compared with the $P_{Pri}$ signal in order to generate a trip command signal whenever the calculated signal exceeds the actual primary coolant pressure signal. The pre-trip and trip pressure signals will be applied to suitable alarm and control rod "scram" circuits which do not comprise part of the present invention.

FIG. 2 depicts an alternate method for the calculation of $Q_{DNB}$ in accordance with the present invention.

In the embodiment of FIG. 1 the radial peaking factor function generator 106 infers rod or control element assembly (CEA) position from the measured power signal Q applied thereto. In the FIG. 2 embodiment CEA group position is measured directly. To accomplish such a direct measurement output signals from rod position detection system 54 are applied to an averaging circuit 150; the output of averaging circuit 150 as well known in the art being an average rod position signal. This average rod position signal is applied to a radial peaking factor function generator 106' to generate the compensation signal R. The R signal, the $A_1$ axial peaking factor compensation signal from function generator 118 and the Q power signal from selector circuit 92 are applied to a multiplication circuit 110' to generate the $Q_{DNB}$ signal.

As an alternative to averaging the position of all rods, the position of any one control rod in each control bank may be sensed and summed and the reactor may include a rod block circuit which keeps all of the control element assemblies within a control bank aligned and which assures that a predefined control bank sequencing program is followed.

While preferred embodiments have been shown and described, various modifications and substitutions may be made thereto without departing from the spirit and scope of the invention. Accordingly, it is to be understood that the present invention has been described by way of illustration and not limitation.

What Is claimed is:
1. In a thermal damage protection system for a nuclear steam supply system, said steam supply system including a reactor core having channels therein through which a coolant is circulated, said steam supply system further including sensors for generating signals commensurate with the coolant temperature and means for measuring and providing a signal commensurate with core power as a function of measured neutron flux, the nuclear steam supply system also including means for sensing and generating signals commensurate with neutron flux at a plurality of locations adjacent the core, the improvement comprising:
means responsive to signals commensurate with coolant temperature upstream and downstream of the reactor core for generating a signal commensurate with core power as a function of the thermal energy added to the coolant;
first comparator means responsive to said signal commensurate with core power as a function of added thermal energy and to a signal commensurate with core power as a function of measured neutron flux for selecting the power signal commensurate with the higher power level;
means responsive to the power signal selected by said selecting means for generating a first compensation signal which varies as a function of core radial peaking factor;
means responsive to signals commensurate with neutron flux sensed at a plurality of locations adjacent the core for generating a second compensation signal which varies as a function of the axial distribution of power in the core;
means responsive to said selected power and first and second compensation signals for generating a core power signal compensated for axial and radial peaking factors; and
means responsive to said compensated power signal and to a signal commensurate with the coolant temperature upsteam of the reactor core for generating a signal commensurate with the core thermal limit as a function of a coolant pressure.

2. The apparatus of claim 1 further comprising:
means responsive to said signal commensurate with power as a function of added thermal energy and to a signal commensurate with core downstream coolant temperature for generating a signal commensurate with the coolant pressure at which temperature saturation will occur; and
second comparator means responsive to said signal commensurate with saturation pressure and to said signal commensurate with core thermal limit as a function of coolant pressure for providing a pressure trip point signal commensurate with the instantaneously maximum one of the compared signals.

3. The apparatus of claim 1 further comprising:
means for correcting the upstream coolant temperature signal to compensate for stratification effects before applying said temperature signal to said thermal limit signal generating means.

4. The apparatus of claim 2 further comprising:
means for correcting the upstream coolant temperature signal to compensate for stratification effects before applying said temperature signal to said thermal limit signal generating means.

5. The apparatus of claim 2 wherein said means for generating a signal commensurate with saturation pressure comprises:
means responsive to said signal commensurate with power as a function of added thermal energy for generating a stratification compensation signal;
means responsive to said stratification compensation signal and a signal commensurate with core downstream coolant temperature for adjusting said temperature signal as a function of said stratification compensation signal; and
means for varying said adjusted downstream temperature signal in accordance with the relationship between temperature and the known reactor cooling system pressure at which temperature saturation occurs to generate a saturation pressure signal.

6. The apparatus of claim 5 wherein said means for generating a signal commensurate with saturation pressure further comprises:
means third comparator responsive to a plurality of signals commensurate with coolant temperature downstream of the reactor core for selecting a signal commensurate with maximum coolant temperature for application to said stratification compensation signal generating means.

7. The apparatus of claim 1 wherein said reactor system includes a plurality of coolant circulator pumps and wherein said protection system further comprises:
means for varying the signal commensurate with core power as a function of added thermal energy in accordance with the circulator pump operating configuration prior to application to said selecting means.

8. The apparatus of claim 7 wherein said first compensation signal generating means comprises:
first function generator means; and
means for adjusting said first function generator means in accordance with the circulator pump operating configuration whereby a radial peaking factor signal which varies with coolant flow rate is generated.

9. The apparatus of claim 7 wherein said means for generating a first compensation signal comprises:
means for generating a signal commensurate with average control rod position;
first function generator means responsive to said average rod position signal for generating a first variable bias signal; and
means responsive to said variable bias signal and to said selected power signal for generating said first compensation signal.

10. The apparatus of claim 7 wherein said means for generating a second compensation signal comprises:
means responsive to signals commensurate with measured neutron flux for generating a signal commensurate with axial power offset;
function generator means, said function generator means being responsive to said axial power offset signal for generating said second compensation signal; and
means for adjusting the output of said function generator means in response to the circulator pump operating configuration.

11. The apparatus of claim 8 wherein said means for generating a second compensation signal comprises:
means responsive to signals commensurate with measured neutron flux for generating a signal commensurate with axial power offset;
second function generator means, said second function generator means being responsive to said axial power offset signal for generating said second compensation signal; and
means for adjusting the output of said second function generator means in response to the circulator pump operating configuration.

12. The apparatus of claim 9 wherein said means for generating a second compensation signal comprises:
means responsive to signals commensurate with measured neutron flux for generating a signal commensurate with axial power offset;
function generator means, said function generator means being responsive to said axial power offset signal for generating said second compensation signal; and
means for adjusting the output of said function generator means in response to the circulator pump operating configuration.

13. The apparatus of claim 11 further comprising
means responsive to said signal commensurate with power as a function of added thermal energy and to a signal commensurate with core downstream coolant temperature for generating a signal commensurate with the coolant pressure at which temperature saturation will occur; and
second comparator means responsive to said signal commensurate with saturation pressure and to said signal commensurate with core thermal limit as a function of coolant pressure for providing a pressre trip point signal commensurate with the instantaneously maximum one of the compared signals.

14. The apparatus of claim 12 further comprising:
means responsive to said signal commensurate with power as a function of added thermal energy and to a signal commensurate with core downstream coolant temperature for generating a signal commensurate with the collant pressure at which temperature saturation will occur; and
second comparator means responsive to said signal commensurate with saturation pressure and to said signal commensurate with core thermal limit as a function of coolant pressure for providing a pressure trip point signal commensurate with the instantaneously maximum one of the compared signals.

15. The apparatus of claim 13 wherein said core thermal limit signal generating means comprises:
means for modifying said signal commensurate with upstream coolant temperature in accordance with a constant which changes with the circulator pump configuration;
means for modifying said compensated core power signal in accordance with a constant which changes with the circulator pump configuration;
means for combining said modified upstream temperature and selected power signals to generate said core thermal limit signal.

16. The apparatus of claim 14 wherein said core thermal limit signal generating means comprises:
means for modifying said signal commensurate with upstream coolant temperature in accordance with a coolant which changes with the circulator pump configuration;
means for modifying said compensated core power signal in accordance with a constant which changes with the circulator pump configuration;
means for combining said modified upstream temperature and selected power signals to generate said core thermal limit signal.

17. The apparatus of claim 2 further comprising:
means for generating a minimum coolant pressure signal; and
means for applying said minimum coolant pressure signal as a third input to said second comparator means.

18. The apparatus of claim 15 further comprising:
means for generating a minimum coolant pressure signal; and
means for applying said minimum coolant pressure signal as a third input to said second comparator means.

19. The apparatus of claim 16 further comprising:
means for generating a minimum coolant pressure signal; and
means for applying said minimum coolant pressure signal as a third input to said second comparator means.

20. The apparatus of claim 18 further comprising:
means for correcting the upstream coolant temperature signal to compensate for stratification effects before applying said temperature signal to said thermal limit signal generating means.

21. The apparatus of claim 19 further comprising:
means for correcting the upstream coolant temperature signal to compensate for stratification effects before applying said temperature signal to said thermal limit signal generating means.

22. Apparatus for generating a signal commensurate with the pressure at which temperature saturation will occur in a steam supply system comprising:
means for generating a signal commensurate with the thermal energy added to the circulating fluid in the system;
means responsive to said signal commensurate with added thermal energy for generating a variable stratification bias signal;
means for generating a signal commensurate with maximum system circulating fluid temperature;
means responsive to said generated bias and temperature signals for generating a temperature signal calibrated for stratification effects; and
means for varying said calibrated temperature signal in accordance with the relationship between temperature and the system pressure at whih temperature saturation occurs to provide a saturation pressure signal.

23. The apparatus of claim 22 wherein said means for generating a signal commensurate with added thermal energy comprises:
means for sensing and generating signals proportional to the temperature of the circulating fluid upstream and downstream of the heat source of the steam supply system; and
means responsive to said temperature signals for generating a signal commensurate with power as a function of added thermal energy.

24. The apparatus of claim 23 wherein said means for generating a signal commensurate with added thermal energy further comprises:
means for varying said power signal as a function of the selected fluid flow rate prior to application to said bias signal generating means.

25. A method for predicting whether the core thermal limits of a nuclear reactor are in danger of being violated comprising the steps of:
adjusting a measured value of core power to compensate for core radial peaking factor and the axial distribution of power in the core;
computing the thermal margin set point as a function of the temperature of a coolant circulated through the reactor core as measured upstream of the core and core power compensated for radial peaking factor and axial power distribution, the computed thermal margin set point being indicative of the core thermal limit as a function of coolant pressure; and
comparing the computed thermal margin set point with the actual coolant pressure.

26. The method of claim 25 wherein the step of compensating a measured value of core power for radial peaking factor and axial power distribution includes:
adjusting a measure of core power in accordance with a known radial peaking factor versus power curve;
calculating an axial power off-set factor as a function of the power distribution in the upper and lower halves of the reactor core; and
further adjusting the measure of core power in accordance with a point on a known axial peaking factor versus axial off-set curve corresponding to the calculated axial off-set factor.

27. The method of claim 26 wherein the step of compensating a measured value of core power for radial peaking factor and axial powr distribution further includes:
calculating the core power as a function of coolant temperature rise across the reactor core;
measuring core power as a function of neutron flux; and
selecting the measure of core power indicative of the highest power level for adjustment in accordance with radial peaking factor and axial power distribution.

28. The method of claim 27 further comprising:
choosing the radial peaking factor versus power and axial peaking factor versus axial off-set curves as a function of the instantaneous coolant mass flow conditions for the reactor core.

29. The method of claim 26 further comprising:
correcting the computed thermal margin set point for the effects of coolant stratification.

30. The method of claim 27 further comprising:
correcting the computed thermal margin set point for the effects of coolant stratification.

31. The method of claim 26 further comprising:
calculating the pressure at which core coolant temperature saturation will occur; and
selecting the maximum of the computed thermal margin set point and temperature saturation pressure signals for comparison with the actual coolant pressure.

32. The method of claim 31 wherein the step of calculating the pressure at which temperature saturation will occur includes:
calculating a stratification bias factor as a function of the thermal energy added to the coolant circulating through the reactor core;
adjusting a measured value of maximum coolant temperature in accordance with the stratification bias factor; and
determining an adjustable saturation pressure corresponding to the adjusted maximum temperature, said pressure being determined in accordance with a known relationship between temperature and the system pressure at which temperature saturation occurs.

33. The method of claim 32 wherein the step of compensating a measured value of core power for radial peaking factor and axial power distribution includes:
adjusting a measure of core power in accordance with a known radial peaking factor versus power curve;
calculating an axial power off-set factor as a function of the power distribution in the upper and lower halves of the reactor core; and
further adjusting the measure of core power in accordance with a point on a known axial peaking factor versus axial off-set curve corresponding to the calculated axial off-set factor.

34. The method of claim 33 wherein the step of compensating a measured value of core power for radial peaking factor and axial power distribution further includes:
calculating the core powr as a function of coolant temperature rise across the reactor core;
measuring core power as a function of neutron flux; and
selecting the measure of core power indicative of the highest power level for adjustment in accordance with radial peaking factor and axial power distribution.

35. The method of claim 34 further comprising:
choosing the radial peaking factor versus power and axial peaking factor versus axial off-set curves as a function of the instantaneous coolant mass flow conditions for the reactor core.

36. The method of claim 35 further comprising:
correcting the computed thermal margin set point for the effects of coolant stratification.

37. The method of claim 36 further comprising:
calculating the pressure at which core coolant temperature saturation will occur; and
selecting the maximum of the computed thermal margin set point and temperature saturation pressure signals for comparison with the actual coolant pressure.

* * * * *

UNITED STATES PATENT AND TRADEMARK OFFICE
CERTIFICATE OF CORRECTION

PATENT NO. : 3,998,693
DATED : December 21, 1976
INVENTOR(S) : Charles R. Musick It is certified that error appears in the above-identified patent and that said Letters Patent are hereby corrected as shown below:

Column 1, line 32, "demage" should be --damage--

Column 3, line 17, "$F_2(Z)$" should be --$F_z(Z)$--

Column 3, line 56, "gin for a Nuclear Reactor Protection System" should be --gin Protection System for a Nuclear Reactor"--

Column 6, line 11, "required" should be --requires--

Column 6, line 17, "produce" should be --produced--

Column 9, line 5, "$\tau [a\Delta T + T_c]$" should be -- $\gamma \frac{d}{dt} \left[ a\Delta T + T_c \right]^c$ --

Column 9, line 14, before "$=K\alpha$", first occurrence, insert -- $\frac{B}{F}$ --

Column 9, line 15, before "$T_{Cam} + a\Delta T)$" insert -- $\frac{d}{dt}$ --

Column 9, line 35, before "signal" insert -- $\frac{B}{F}$ --

Column 12, line 38, "$\Gamma_4, \Delta_4$ and $\gamma_4$" should be -- $\alpha_4, \beta_4$ and $\sigma_4$ --

Column 13, line 23, "a" should be --A--

UNITED STATES PATENT AND TRADEMARK OFFICE
CERTIFICATE OF CORRECTION

PATENT NO. : 3,998,693
DATED : December 21, 1976
INVENTOR(S) : Charles R. Musick It is certified that error appears in the above-identified patent and that said Letters Patent are hereby corrected as shown below:

Column 15, line 48, (claim 6, line 4) "means third comparator" should be --third comparator means--

Column 16, line 57 (claim 13, line 11), "pressre" should be --pressure--

Column 16, line 65, (claim 14, line 6) "collant" should be --coolant--

Column 18, line 56 (claim 27, line 3) "powr" should be --power--

Column 20, line 15, (claim 34, line 5) "powr" should be --power--

Signed and Sealed this

Eighth Day of March 1977

[SEAL]

Attest:

RUTH C. MASON
Attesting Officer

C. MARSHALL DANN
Commissioner of Patents and Trademarks